(12) United States Patent
Enderich et al.

(10) Patent No.: US 7,762,595 B2
(45) Date of Patent: Jul. 27, 2010

(54) IMPACT DAMPING DEVICE

(75) Inventors: Thomas Enderich, Hünstetten (DE); Roland Maucher, Eltville (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/066,634

(22) PCT Filed: Sep. 7, 2006

(86) PCT No.: PCT/EP2006/008717

§ 371 (c)(1),
(2), (4) Date: May 15, 2008

(87) PCT Pub. No.: WO2007/031226

PCT Pub. Date: Mar. 22, 2007

(65) Prior Publication Data

US 2009/0021031 A1    Jan. 22, 2009

(30) Foreign Application Priority Data

Sep. 14, 2005  (DE) ........................ 10 2005 043 708

(51) Int. Cl.
*B60R 19/34* (2006.01)
(52) U.S. Cl. .................... 293/133; 296/187.09; 188/377
(58) Field of Classification Search ................. 293/102, 293/132, 133; 188/371, 377; 296/187.03, 296/187.09
See application file for complete search history.

(56) References Cited

U.S. PATENT DOCUMENTS

| | | | |
|---|---|---|---|
| 3,495,474 A | | 2/1970 | Nishimura et al. |
| 4,971,376 A | * | 11/1990 | Eipper et al. ................. 293/132 |
| 4,988,081 A | * | 1/1991 | Dohrmann ................. 267/64.15 |
| 4,995,486 A | * | 2/1991 | Garneweidner ............. 188/374 |
| 5,181,589 A | * | 1/1993 | Siegner et al. .............. 188/374 |
| 5,427,214 A | * | 6/1995 | Prottengeier et al. ........ 188/374 |
| 5,884,959 A | * | 3/1999 | Hillen ......................... 293/134 |

(Continued)

FOREIGN PATENT DOCUMENTS

DE        4300284 A1    1/1994

(Continued)

OTHER PUBLICATIONS

German Patent Office, German Search Report for German Application No. 102005043708.7, Apr. 7, 2006.

*Primary Examiner*—Lori L Lyjak
(74) *Attorney, Agent, or Firm*—Ingrassia Fisher & Lorenz, P.C.

(57) ABSTRACT

Impact damping arrangement, in particular for a motor vehicle, comprising a cross member and at least one impact damper, an impact damper being positioned between the cross member and a vehicle frame for absorbing a force ($F_L$) in the direction of the longitudinal axis of the impact damper, wherein the connection of the impact damper to the vehicle frame comprises an absorbing arrangement having at least one deformation zone to bring about the attenuation of a force introduced transversely to the longitudinal axis of the impact damper by means of a material deformation in the deformation zone. An impact damping arrangement is thus provided which absorbs an impact in the longitudinal direction of the motor vehicle as well as an impact with a force effect extending transversely to the longitudinal axis of the motor vehicle.

20 Claims, 3 Drawing Sheets

U.S. PATENT DOCUMENTS

| | | | | |
|---|---|---|---|---|
| 6,027,105 | A * | 2/2000 | Dohrmann et al. | 267/139 |
| 6,179,356 | B1 * | 1/2001 | Hartlieb et al. | 293/133 |
| 6,227,583 | B1 * | 5/2001 | Eipper et al. | 293/133 |
| 6,929,297 | B2 | 8/2005 | Mueller et al. | |
| 7,192,067 | B2 * | 3/2007 | Hansen | 293/133 |
| 2003/0020219 | A1 * | 1/2003 | Konenberg | 267/139 |
| 2003/0075935 | A1 * | 4/2003 | Dohrmann | 293/133 |
| 2004/0169383 | A1 | 9/2004 | Shimotsu | |
| 2006/0022473 | A1 * | 2/2006 | Hansen | 293/133 |

FOREIGN PATENT DOCUMENTS

| | | |
|---|---|---|
| DE | 29715786 U1 | 10/1997 |
| DE | 29823725 U1 | 10/1999 |
| DE | 20013385 U1 | 11/2000 |
| DE | 19943622 A1 | 4/2001 |
| DE | 102004010572 A1 | 3/2005 |
| DE | 102004036929 A1 | 3/2006 |
| EP | 0913599 A2 | 5/1999 |
| JP | 2003048498 A | 2/2003 |
| JP | 2005022598 A | 1/2005 |

* cited by examiner

IMPACT DAMPING DEVICE

CROSS-REFERENCE TO RELATED APPLICATIONS

This application is a U.S. National-Stage entry under 35 U.S.C. § 371 based on International Application No. PCT/EP2006/008717, filed Sep. 7, 2006, which was published under PCT Article 21(2) and which claims priority to German Application No. 10 2005 043 708.7, filed Sep. 14, 2005.

TECHNICAL FIELD

The invention relates to an impact damping arrangement, in particular for a motor vehicle, comprising a cross member and at least one impact damper, an impact damper being positioned between the cross member and a vehicle frame for absorbing a force (FL) in the direction of the longitudinal axis of the impact damper.

BACKGROUND

Impact damping arrangements are generally used for damping motor vehicular impact and are connected on the one hand on the cross member which is connected to the bumper and on the other hand to the vehicle frame. In the event of a collision which impacts externally on the bumper, the device prevents greater damage being caused to the frame of the vehicle. The cross member and the vehicle frame are designed with a high degree of rigidity so that the energy from a relatively minor collision is not absorbed by a plastic deformation in the cross member nor in the vehicle frame. This is achieved in that the impact damping arrangement absorbs the impact energy, thereby greatly reducing the forces acting on the vehicle frame. Damage to the panel components of the vehicle frame can thus be avoided, which greatly reduces or avoids possible repair costs. The impact damping arrangement is usually configured such that it absorbs the impact energy by a partial plastic deformation, so that when the vehicle is repaired, it is only the impact damping arrangement itself which has to be replaced.

DE 200 13 385 U1 discloses an impact damping arrangement of this type for motor vehicles. This impact damping arrangement for motor vehicles has a damper with a deformation tube which has at least one longitudinal slot extending in an insertion direction and a recess formed at one end of the longitudinal slot, the diameter of which is greater than the width of the longitudinal slot. In the event of an impact, the deformation tube is driven in the insertion direction through a supporting tube surrounding the deformation tube in the direction of the vehicle frame, deformation portions widening longitudinal slots which extend along the wall of the deformation tube, with a corresponding irreversible deformation of the deformation tube. As a result of the arrangement of the impact damping arrangement in the longitudinal direction of the vehicle and in particular due to the longitudinal slots configured along the deformation tube, the energy absorption of an impact is possible only in the longitudinal direction of the vehicle, so that impact forces which act transversely or at an angle to the vehicle cannot be absorbed by the impact damping unit. In the event of a transverse impact, this can result in considerable damage to the vehicle frame, which can mean that complex and thus costly repairs are necessary.

DE 198 32 114 A1 discloses an impact damper for motor vehicles which has an outer supporting tube and a deformation tube which is displaceable therein. Furthermore, a reversible impact damper is provided with a displaceable cylindrical housing projecting over the free end of the supporting tube and a piston rod which is guided displaceably in a reversible damped manner in the housing and which is connected to the deformation tube at least in the insertion direction. A deformation device is also provided with a reinforced projection configured on the supporting tube and protruding towards the axle. The impact damper is characterised in that the free end of the deformation tube projects with a guide portion over the free end of the supporting tube counter to the insertion direction and the housing is guided displaceably in the guide portion.

The known impact damping arrangements encounter the problem that due to the guidance and to the tubes which run one inside the other as supporting tube and deformation tube, it is only possible for an impact in the longitudinal direction of the impact damper to be absorbed, so that forces which arise transversely to the impact damper are introduced into the vehicle frame without being reduced. The impact dampers are attached by welds which have a high degree of rigidity and in the event of a force acting transversely at an angle to the longitudinal axis of the tubes, the welds can cause considerable damage to the vehicle frame due to their low flexibility. Thus, flexibility is provided only in the longitudinal direction of the damping unit, and force effects arising at an angle to the longitudinal axis cannot be absorbed.

It is known from the familiar rear AZT crash repair test, new RCAR structural test—10°, Allianz Zentrum für Technik GmbH, that to classify possible damage to a vehicle frame, impact tests are usual in which a collision is produced between a barrier (1000 kg-1400 kg) with a movement (15+1 km/h) at an angle (10°) to the longitudinal axis of the vehicle and the motor vehicle with a partial overlap (40%). As a result, a new loading condition is produced for the impact damping arrangement which has a transverse component of the acting force based on the longitudinal axis of the vehicle. However, this transverse force component cannot be absorbed by present impact damping arrangements without the possibility of the vehicle frame being damaged.

It is therefore the object of the present invention to provide an impact damping arrangement which absorbs an impact in the longitudinal direction of the motor vehicle as well as an impact with a force effect which runs transversely to the longitudinal axis of the motor vehicle.

SUMMARY

This object is achieved based on an impact damping arrangement according to an impact damping arrangement for a motor vehicle, comprising a cross member and at least one impact damper, the at least one impact damper being positioned between the cross member and a vehicle frame for absorbing a force (FL) in the direction of the longitudinal axis of the impact damper, wherein the connection of the impact damper to the vehicle frame comprises an absorbing arrangement having at least one deformation zone to bring about the attenuation of a force introduced transversely to the longitudinal axis of the impact damper by means of a material deformation in the deformation zone. Advantageous developments of the invention are set out in the dependent claims.

The invention incorporates the technical teaching that the connection of the impact damper to the vehicle frame comprises an absorbing arrangement and this absorbing arrangement has at least one deformation zone to bring about the absorption of a force introduced transversely to the longitudinal axis of the impact damper by means of a material deformation in the deformation zone.

This solution affords the advantage that an impact damping arrangement is provided which allows a controlled energy absorption from an impact by means of a deformation zone, which impact takes place at least partly transversely to the longitudinal direction of the vehicle. The impact damping arrangement connects the impact damper to the vehicle frame so that on the one hand it accommodates the impact damper and on the other hand it is connected to the vehicle frame, for example by means of a screw connection. The impact damping arrangement advantageously has a deformation zone which is located in the force flow between the impact damper connected to the cross member of the motor vehicle and the vehicle frame itself. Consequently, the impact damper absorbs the shock component along the vehicle and in the event of a lateral effect of a force by an impact on the bumper, this induces a plastic deformation in the deformation zone, in that the impact damper bends away by a compression movement or a lateral rotational movement in the impact damping arrangement. As a result, shock components transverse to the longitudinal axis of the vehicle are absorbed by the impact damping arrangement through the plastic deformation in the deformation zone of the impact damping arrangement, and relatively severe damage to the vehicle frame can be avoided.

A further measure improving the invention provides that the absorbing arrangement is configured with a cup-shaped arched member for receiving the impact damper, the absorbing arrangement being positioned transversely to the longitudinal axis of the impact damper and connected on the outside to the vehicle frame. A metallic material is advantageous for absorbing energy by a deformation, as it provides a considerable deformability after passing through a resilient region; in particular a steel material or an aluminium alloy can be used in this respect. In addition to the use of a metallic material, it is also possible and just as advantageous to use plastics materials. The impact damper is connected to the absorbing arrangement, the impact damper being introduced into or positioned on a hole made in the arched member in the region of the cup-shaped arched member with the absorbing arrangement and the connection can be produced by means of a weld or a compression joint. On the outside, the absorbing arrangement is connected to the vehicle frame, in which case the connection can be produced, for example as a screw connection and the screws are guided through holes in the corner regions in the absorbing arrangement. This arrangement provides an optimal connection to allow a maximum energy absorption in a crash with a transverse force component.

The cup-shaped arched member is advantageously formed in a steplike manner in one piece or in multiple pieces out of the absorbing arrangement, so that a deformation space is produced under the arched member. Thus, a deformation space can advantageously be used for the deformation of the absorbing arrangement. In the event of an impact with a sufficiently great transverse force component, the absorbing arrangement buckles such that the cup-shaped arched member is moved into the deformation space by means of a plastic deformation. The absorbing arrangement can on the one hand buckle away unilaterally so that the impact damper is positioned at an angle in the arched member or on the other hand is pressed into the cup-shaped arched member if the impact has a correspondingly great force component in the longitudinal direction of the vehicle. In this arrangement, the deformation space affords a sufficiently great distance between the arched member or the connection point of the impact damper and the vehicle frame, such that the vehicle frame is not damaged even in the event of a relatively great deformation.

It is particularly advantageous for structural reasons that the absorbing arrangement has an absorbing plate and a base plate connected to the absorbing plate and that the base plate has a hole located centrally in the longitudinal axis. This allows the provision of a very robust absorbing arrangement which is inherently very rigid and allows deformations in a controlled manner only in the deformation zone in the event of an impact. If the absorbing plate is torn out, it is possible for the vehicle frame to advantageously remain undamaged by a predetermined restricted strength of the connection between the absorbing plate and the base plate, which can consist, for example of a screw connection or a weld. The advantage of the arrangement of a hole in the base plate of the impact damping arrangement is the controllable buckling behaviour of the impact damper in the absorbing arrangement or in the absorbing plate. If the impact damper has a tube element, then this tube element can pass through the upwardly located hole in the absorbing plate and extend in the direction of the hole in the base plate. In an impact, the cup-shaped arched member can be compressed in the direction of the base plate, the tube element moving into the hole in the base plate. If there is a bend during the deformation in the event of an impact, the end of the tube element can abut against the edge of the hole in the base plate, which greatly increases the resistance to bending. The further the tube element moves in or through the hole in the base plate as a result of the cup-shaped arched member being compressed, the greater the possible buckling angle becomes.

An advantageous embodiment of the impact damping arrangement is characterised in that the impact damper has an inner tube element connected to the cross member and an outer tube element connected to the absorbing arrangement, the inner tube element extending into the outer tube element and a relative movement of both tube elements with respect to one another causing a damping effect in the direction of the longitudinal axis of the impact damper. This configuration of the impact damping arrangement advantageously has a simple and very robust construction, it being possible for the force/deformation behaviour to be adjusted by means of the type of pressing of the two tube elements. Alternative embodiments of an impact damper for absorbing longitudinal forces can also be used which have a form which enables an arrangement between a cross member and a vehicle frame and allows cooperation with the absorbing arrangement.

The impact damping arrangement is advantageously positioned for impact damping on the front of the motor vehicle and/or on the rear of the motor vehicle. This enables the frame of the front region of the vehicle as well as of the rear region of the vehicle to be protected effectively from relatively serious damage. In the arrangement of the impact damping arrangement between the front cross member and the vehicle frame, the impact damper can be positioned in the longitudinal member of the vehicle bodywork so that it takes up a minimum amount of space.

A further measure which improves the invention provides that the impact damper and the absorbing arrangement are provided between the cross member and the vehicle frame once or more times, preferably twice, externally on the cross member. A twofold arrangement of the device allows an optimal attachment solution of the cross member to the vehicle frame to be found, especially as both the left and the right rear side of the motor vehicle have an impact damping arrangement, so that it is possible to optimally absorb an impact from both directions.

In order to arrange the impact damping arrangement such that an impact can be optimally absorbed at an angle to the longitudinal axis of the vehicle, it is provided that the impact dampers which are preferably provided in duplicate are set with the absorbing arrangements, positioned in each case transversely to the longitudinal axis of the impact dampers, with an angle between the cross member and the vehicle frame, so that the longitudinal axes of the impact dampers intersect on the vehicle side. The impact dampers are thus positioned outwardly towards the side of the vehicle and, in the event of an impact, can advantageously rotate in the absorbing plate by a deformation in the direction of the vehicle longitudinal axis and can optimally absorb the impact and the impact energy.

At least the absorbing plate advantageously has cut outs for the controlled weakening of the structure in the region of the deformation zone to adjust the deformation behaviour of the absorbing arrangement by forces introduced transversely to the longitudinal axis of the tube elements, and the absorbing plate of the absorbing arrangement has a material thickness which adjusts the load level to be supported of the forces introduced transversely to the longitudinal axis of the tube elements and thereby makes it possible to influence the deformation behaviour in the deformation zone. A weakening of the absorbing arrangement can thus be intentionally produced to limit the maximally arising forces until a plastic deformation occurs in the deformation zone. The limitation of the force acting on the absorbing arrangement up to the deformation of the material in the deformation zone can also be adjusted by means of the thickness of the sheet metal material, so that a relatively thin sheet metal thickness causes an earlier deformation of the metal body, which can occur even in the case of small forces. If a plastics material is used for the absorbing arrangement, it is furthermore possible to adjust the deformation behaviour of the absorbing arrangement by the choice of plastics material and a possible ribbing effect.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
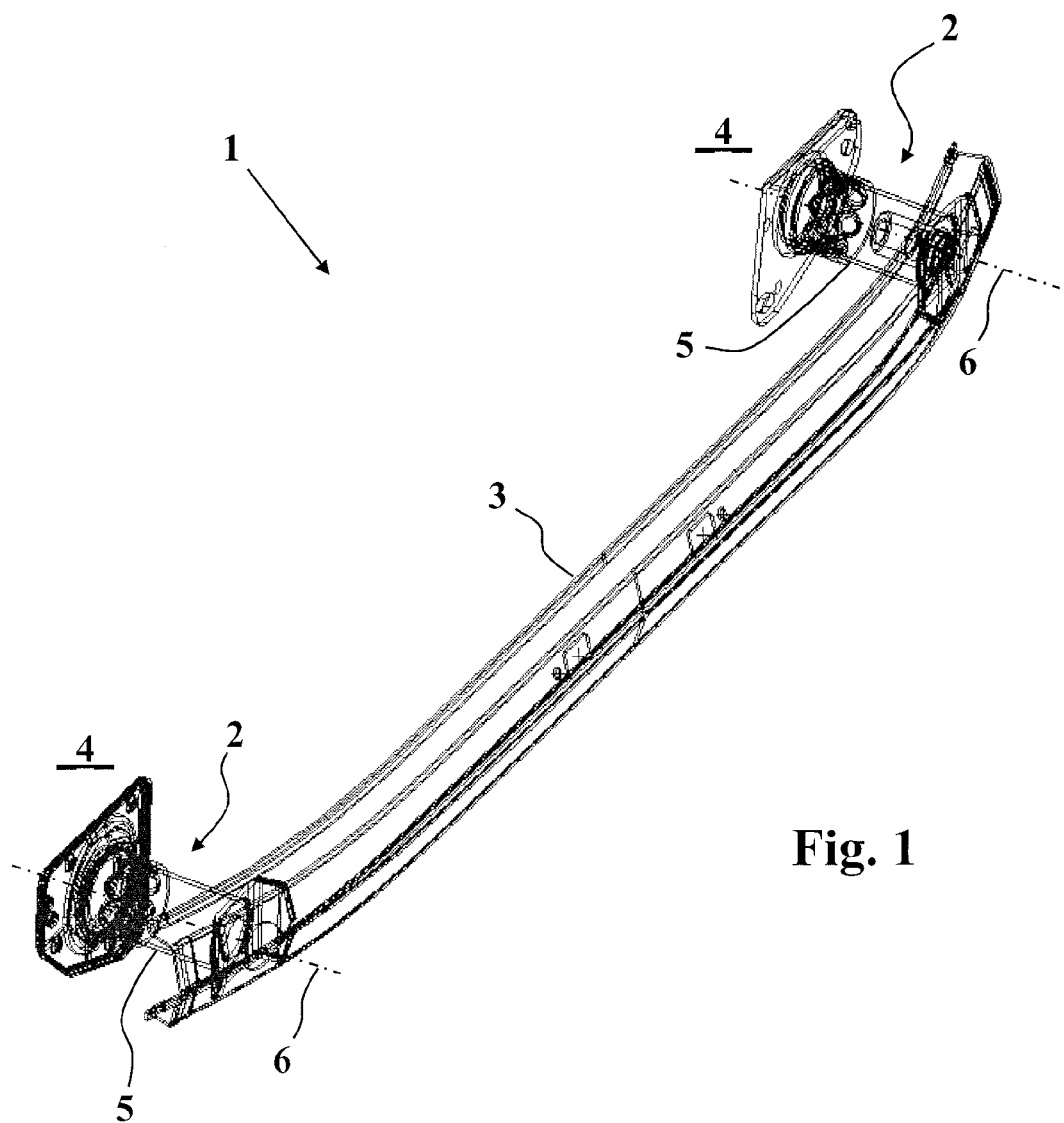
FIG. 1 is a perspective view of the impact damping arrangement.

The perspective view shown in FIG. 1 shows an impact damping arrangement 1 comprising a cross member 3, two impact dampers 5 being positioned in each case approximately at the end of the cross member 3 on the left-hand and right-hand outer surface of the vehicle frame. The cross member 3 is configured as a U-profile and is positioned, not visible from outside, behind the shock absorber (not shown) of the motor vehicle 2. The impact damping arrangement 1 is mounted detachably on the vehicle frame 4 and connects a tubular or cylindrical impact damper 5 to the vehicle frame 4, wherein the longitudinal axes 6 of the impact dampers 5 extend substantially perpendicularly to the cross member 3 and thus arrange the cross member 3 at a distance from the vehicle frame 4 according to the length of the impact dampers 5.

Figure 2:
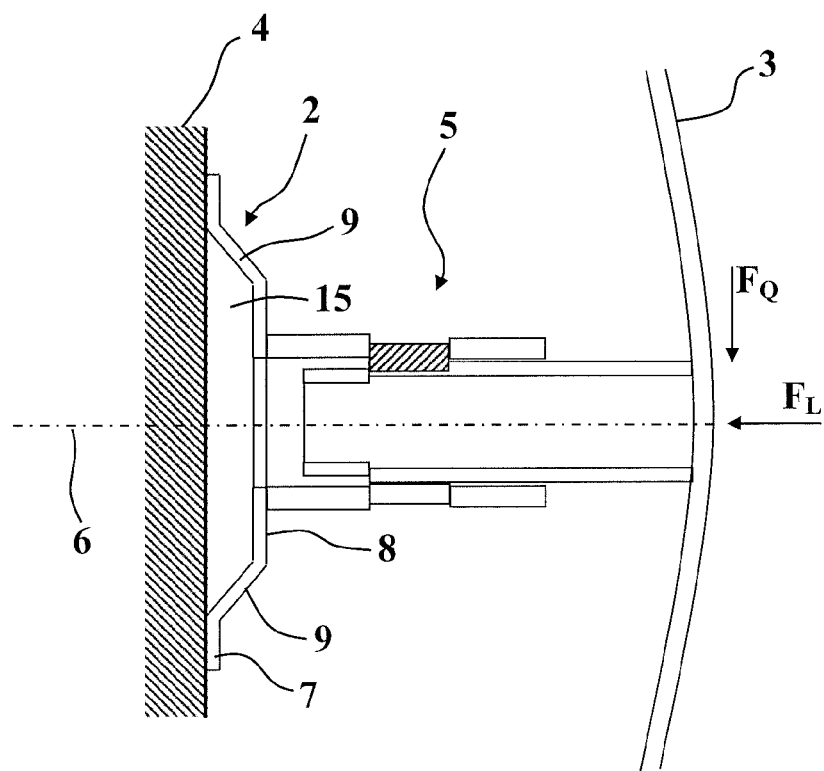
FIG. 2 is a schematic illustration of a cross section through the impact damping arrangement.

FIG. 2 shows a schematic illustration of a cross section through an impact damping arrangement 1, the impact damping arrangement 1 connecting the impact damper 5 to the vehicle frame which is a part of the motor vehicle 2. The impact damping arrangement 1 has an absorbing arrangement 7 which, according to the present embodiment, consists of a metal sheet, wherein the sheet has a rectangular contour. The cross sectional view of the absorbing arrangement 7 has a cup-shaped arched member 8 which is configured centrally in the metal sheet and centrally accommodates the impact damper 5. On the outside, the absorbing arrangement 7 is connected to the vehicle frame 4, the detachable connection being made by screws (not shown in detail here). A deformation zone 9 extends between the cup-shaped arched member 8 and the part of the absorbing arrangement 7 connected to the vehicle frame 4. When a force FQ arises transversely to the longitudinal axis 6 of the impact damper 5, the absorbing arrangement 7 deforms in the region of the deformation zone 9, and the impact damper 5 is able to twist itself in the manner of a hinge in the impact damping arrangement 1. The proportion of the shock energy of the impact transverse to the longitudinal direction of the vehicle can thus be dissipated as deformation work in the absorbing arrangement 7, and the forces introduced into the vehicle frame 4 are thereby substantially reduced, and damage to the vehicle frame 4 is avoided.

Figure 3:
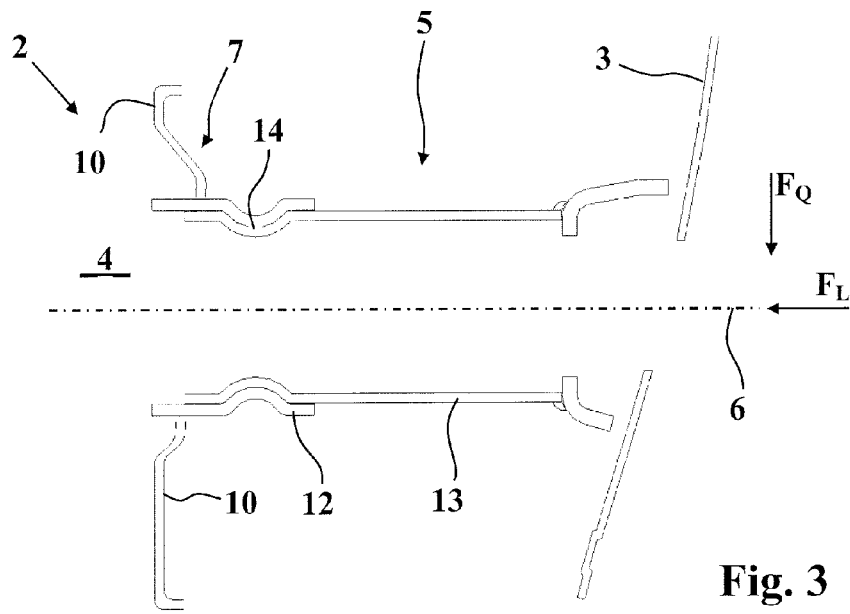
FIG. 3 shows a cross section through an embodiment of an impact damping device with a one-piece absorbing arrangement.
Figure 4:
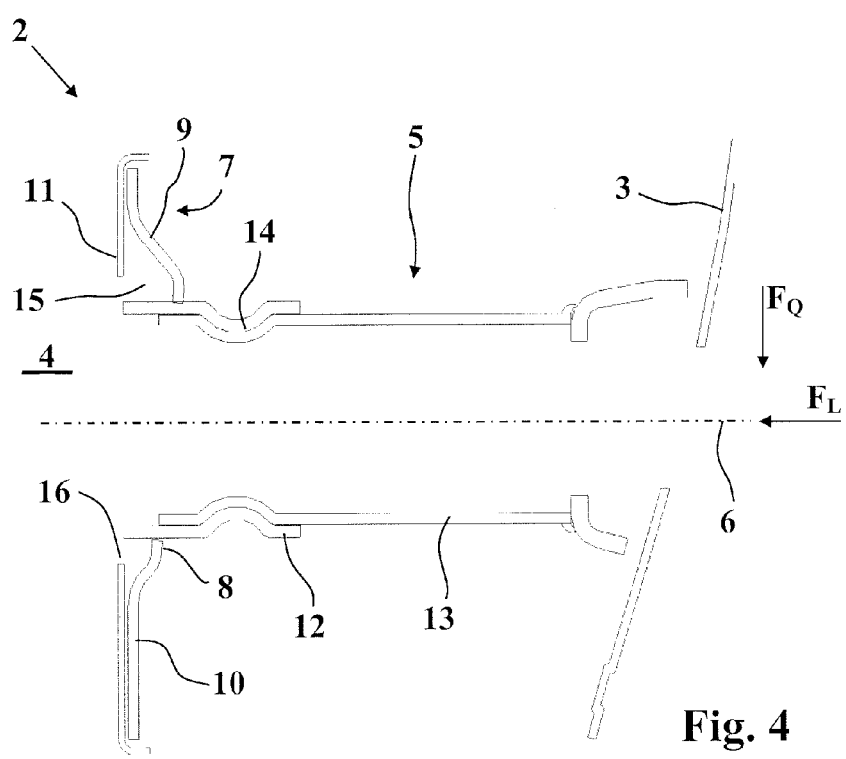
FIG. 4 shows a cross section through a further embodiment of an impact damping arrangement with an absorbing arrangement configured out of an absorbing plate and a base plate.

FIGS. 3 and 4 each show cross sections of further embodiments of an impact damping arrangement 1, the impact damping arrangement 1 in FIG. 3 having a one-piece absorbing arrangement 7 and the impact damping arrangement 1 in FIG. 4 having an absorbing arrangement 7 constructed from an absorbing plate 10 and a base plate 11. The absorbing arrangement 7 of FIG. 3 is not constructed symmetrically, as it is adapted to the contour of the vehicle frame 4. The absorbing plate 10 has a hole, an outer tube element 12 extending through the hole. The outer tube element 12 is pressed with an inner tube element 13, and the force fit 14 can become detached under the effect of a longitudinal force FL in the impact damper 5 by a deformation of the tube elements 12 and 13 and it absorbs the impact energy through the plastic deformation.

In FIG. 4, the two-part absorbing arrangement 7 has an absorbing plate 10 and a base plate 11, both plates 10 and 11 being joined together on the outside. The cup-shaped arched member 8 extends centrally in the absorbing plate 10 remote from the base plate 11, so that a deformation space 15 is formed between the base plate 11 and the cup-shaped arched member 8. In the event of an impact in particular transversely to the longitudinal axis 6 of the impact damper 5, there is a deformation, in the deformation zone 9, of the absorbing arrangement 7 in the region of the absorbing plate 10, so that due to a buckling in and/or an inwards compression of the cup-shaped arched member 8 in the direction of the base plate 11, there is a space available for deformations, so that the deformation takes place in the deformation space 15 and does not damage the vehicle bodywork. The tube element(s) 12 and/or 13 of the impact damper 5 move in the direction of the base plate 11 particularly when there is a compression action of the cup-shaped arched member 8, the base plate 11 having a hole 16 which is positioned centrally in the longitudinal axis 6 and it has a diameter which is greater than the diameter of the inner or outer tube element 12, 13. When the tube element(s) 12 and/or 13 are moved in the direction of the base plate 11 by a force effect, the tube element 12, 13 can move through the hole 16 and, if there is a bend, can abut against the edge of the hole 16, as a result of which the buckle movement is restricted due to the resistance. In this respect, the possible buckle angle between the longitudinal axis 6 of the impact damper 5 and the longitudinal axis of the vehicle is all the greater the further the cup-shaped arched member 8 is compressed by a longitudinal force FL in the direction of the base plate 11.

The invention is not restricted in its implementation to the aforementioned embodiments. A plurality of variants is possible which uses the illustrated solution even with fundamentally different embodiments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An impact damping arrangement for a motor vehicle, the damping arrangement comprising:
    a cross member;
    at least one impact damper, the at least one impact damper being positioned between the cross member and a vehicle frame for absorbing a force (FL) in the direction of the longitudinal axis of the impact damper; and
    an absorbing arrangement connecting the at least one impact damper to the vehicle frame, the absorbing arrangement having at least one deformation zone to bring about the attenuation of a force introduced transversely to the longitudinal axis of the impact damper by means of a material deformation in the deformation zone.

2. The impact damping arrangement according to claim 1, wherein the absorbing arrangement is configured with a cup-shaped arched member for receiving the at least one impact damper, the absorbing arrangement being positioned transversely to the longitudinal axis of the impact damper and being connected on the outside to the vehicle frame.

3. The impact damping arrangement according to claim 2, wherein the cup-shaped arched member is formed in a step like manner out of the absorbing arrangement, so that a deformation space is produced below the arched member.

4. The impact damping arrangement according to claim 1, wherein the absorbing arrangement has an absorbing plate and a base plate connected to the absorbing plate.

5. The impact damping arrangement according to claim 4, wherein the base plate has a hole positioned centrally in the longitudinal axis.

6. The impact damping arrangement according to claim 1, wherein the at least one impact damper has an inner tube element connected to the cross member and an outer tube element connected to the absorbing arrangement, the inner tube element extending into the outer tube element, and a relative movement of the inner tube element and outer tube element with respect to one another causing a damping effect in the direction of the longitudinal axis of the impact damper.

7. The impact damping arrangement according to claim 1, wherein the impact damping arrangement is positioned for an impact damping on a front of the motor vehicle.

8. The impact damping arrangement according to claim 1, wherein the at least one impact damper and the absorbing arrangement are provided at least once on an outside on the cross member between the cross member and the vehicle frame.

9. The impact damping arrangement according to claim 1, wherein a second impact dampers is provided in duplicate with the at least one impact damper and set with a second absorbing arrangement, and positioned transversely to the longitudinal axis of the at least one impact damper, with an angle between the cross member and the vehicle frame, so that the longitudinal axis of the at least one impact dampers and a second longitudinal axis of the second impact damper intersect on the vehicle side.

10. The impact damping arrangement according to claim 6, further comprising an absorbing plate having cut outs for a controlled weakening of a structure in a region of the deformation zone to adjust the deformation behavior of the absorbing arrangement by forces introduced transversely to the longitudinal axis of the inner tube element and outer tube element.

11. The impact damping arrangement according to claim 6, further comprising an absorbing plate of the absorbing arrangement that has a material thickness which adjusts a load level to be supported of the forces introduced transversely to the longitudinal axis of the inner tube element and outer tube element so that the deformation behavior in the deformation zone can be influenced.

12. An impact damping arrangement for a motor vehicle having a frame, the impact damping arrangement comprising:
    a cross member positioned proximate the frame;
    an impact damper disposed between the cross member and the frame, the impact damper being attached to the cross member and being configured to absorb a force in a direction of a longitudinal axis of the impact damper;
    an absorbing arrangement comprising a cup-shaped arched member oriented transversely to the impact damper and attached to the impact damper and the frame, the absorbing arrangement having a deformation zone configured to deform when acted upon by a second force introduced transversely to the longitudinal axis of the impact damper.

13. The impact damping arrangement of claim 12, wherein the cup-shaped arched member is formed in a step like manner out of the absorbing arrangement, so that a deformation space is produced below the cup-shaped arched member.

14. The impact damping arrangement of claim 12, wherein the absorbing arrangement has an absorbing plate and a base plate connected to the absorbing plate.

15. The impact damping arrangement of claim 14, wherein the absorbing plate defines a cut out for a controlled weakening of the absorbing plate proximate the deformation zone.

16. The impact damping arrangement of claim 14, wherein the base plate has a hole positioned centrally and generally aligned with the longitudinal axis of the impact damper.

17. The impact damping arrangement of claim 12, wherein the impact damper has an inner tube element connected to the cross member and an outer tube element connected to the absorbing arrangement, the inner tube element extending into the outer tube element, and a relative movement of the inner tube element and the outer tube element with respect to one another causing a damping effect in a direction of the longitudinal axis of the impact damper.

18. The impact damping arrangement of claim 12, wherein the impact damping arrangement is positioned for an impact damping on a front of the motor vehicle.

19. The impact damping arrangement of claim 12, wherein the deformation zone is oriented at an angle other than about 90 degrees with respect to a longitudinal end of the cup-shaped arched member.

20. An impact damping arrangement for a motor vehicle having a frame, the impact damping arrangement comprising:
   a cross member positioned proximate the frame;
   a plurality of spaced apart impact dampers disposed between the cross member and the frame, each impact damper being attached to the cross member and each impact damper being configured to absorb a force in the direction of a longitudinal axis of the impact damper; and
   a plurality of absorbing arrangements, each absorbing arrangement comprising a cup-shaped arched member attached to one of the impact dampers and to the frame, each absorbing arrangement having a deformation zone configured to deform when acted upon by a force introduced transversely to the longitudinal axis of the one of the impact dampers.

* * * * *